US010508050B2

(12) United States Patent
Levin (10) Patent No.: US 10,508,050 B2
(45) Date of Patent: Dec. 17, 2019

(54) PROCESS AND FACILITY FOR THE TREATMENT OF LIVESTOCK WASTE

(71) Applicant: S.G.T.—Sustainable Green Technologies Ltd., Netanya (IL)

(72) Inventor: Gal Levin, Netanya (IL)

(73) Assignee: S.G.T.—Sustainable Green Technologies Ltd., Netanya (IL)

( * ) Notice: Subject to any disclaimer, the term of this patent is extended or adjusted under 35 U.S.C. 154(b) by 0 days.

(21) Appl. No.: 15/516,870

(22) PCT Filed: Nov. 1, 2016

(86) PCT No.: PCT/IL2016/051177
§ 371 (c)(1),
(2) Date: Apr. 4, 2017

(87) PCT Pub. No.: WO2017/203505
PCT Pub. Date: Nov. 30, 2017

(65) Prior Publication Data
US 2018/0186672 A1    Jul. 5, 2018

(30) Foreign Application Priority Data
May 26, 2016  (IL) .......................................... 245872

(51) Int. Cl.
*C02F 11/04* (2006.01)
*C05F 7/00* (2006.01)
(Continued)

(52) U.S. Cl.
CPC .............. *C02F 11/04* (2013.01); *C02F 3/121* (2013.01); *C02F 9/00* (2013.01); *C05F 7/00* (2013.01);
(Continued)

(58) Field of Classification Search
CPC .. C02F 11/04; C02F 3/121; C02F 9/00; C02F 3/30; C02F 2303/10; C02F 2301/046; C02F 2301/043; C02F 2209/42; C02F 2209/06; C02F 2203/002; C02F 3/282; C02F 2301/04; C02F 3/1263; C02F 2203/006; C02F 2209/005; C02F 2209/10;
(Continued)

(56) References Cited

U.S. PATENT DOCUMENTS 6,126,827 A     10/2000  Johnson, Jr.
2002/0030012 A1*  3/2002  Sullivan ................ C02F 1/5236
                                                         210/631
(Continued)

OTHER PUBLICATIONS

Zhang R. et al., "Treatment of Swine Wastewater with biological conversion, filtration, and reverse osmosis: A laboratory study, Transactions of the ASAE", 2004, vol. 47, No. 1, pp. 243-250.
(Continued)

*Primary Examiner* — Fred Prince
(74) *Attorney, Agent, or Firm* — Moss & Barnett; Michael A. Bondi (57) ABSTRACT

The invention provides an efficient system for treating livestock waste, particularly waste from cattle or pig farming. The new facility and method employ special transfers of slurry streams through ASBR, SBR, and a unique pretreatment reactor, resulting in treated water, quality compost, and biogas.

23 Claims, 3 Drawing Sheets

(51) Int. Cl.
*C05F 17/00* (2006.01)
*C05F 9/00* (2006.01)
*C02F 3/12* (2006.01)
*C02F 1/44* (2006.01)
*C02F 9/00* (2006.01)
*C02F 103/20* (2006.01)

(52) U.S. Cl.
CPC ...... C05F 17/0018 (2013.01); C05F 17/0027 (2013.01); *C02F 1/441* (2013.01); *C02F 3/1263* (2013.01); *C02F 2103/20* (2013.01); *C02F 2203/006* (2013.01); *C02F 2209/005* (2013.01); *C02F 2209/10* (2013.01); *C02F 2209/40* (2013.01); *C02F 2301/04* (2013.01)

(58) Field of Classification Search
CPC .. C02F 2209/40; C02F 2103/20; C02F 1/444; C02F 1/441; C02F 1/283; C02F 1/281; C02F 1/66; C05F 17/02; C05F 17/0027; C05F 17/0018; C05F 7/00; C05F 17/00; C05F 3/00; Y02W 10/15; Y02W 10/30; Y02W 30/43; Y02W 30/47; Y02W 10/23; Y02E 50/343; A01C 3/00; Y02P 20/145; Y02A 40/213
USPC ...... 210/603, 605, 609, 630, 252, 259; 71/9, 71/10, 21

See application file for complete search history.

(56) References Cited

U.S. PATENT DOCUMENTS

| | | | | |
|---|---|---|---|---|
| 2003/0141245 | A1* | 7/2003 | Fetterman | C05F 3/00 210/609 |
| 2004/0025715 | A1* | 2/2004 | Bonde | A01C 3/00 99/485 |
| 2005/0035059 | A1 | 2/2005 | Zhang | |
| 2008/0314837 | A1* | 12/2008 | Vanotti | A01C 3/00 210/705 |
| 2011/0318778 | A1* | 12/2011 | Petersen | C05F 17/0018 435/41 |
| 2014/0338411 | A1* | 11/2014 | Nunn | C05F 3/06 71/9 |
| 2018/0236512 | A1* | 8/2018 | Kim | B09C 1/105 |

OTHER PUBLICATIONS

International Search Report and Written opinion for PCT App. No. PCT/IL2016/051177 dated Feb. 9, 2017, 7 pgs.

* cited by examiner

PROCESS AND FACILITY FOR THE TREATMENT OF LIVESTOCK WASTE

FIELD OF THE INVENTION

The present invention relates to the treatment of livestock waste. More particularly, the invention relates to system and process for converting livestock waste into compost, treated water, and energy.

BACKGROUND OF THE INVENTION

The treatment of wastes, particularly livestock waste, is a critical problem in the majority of developed countries, as it causes grave environmental and economic concerns. Large farms—10,000 and more animals—exert pressure on the ecosystem and present problems difficult to solve both in the short-term and the long term. In an attempt to prevent ecological disaster, various countries have legislated limitations to the amount of livestock wastes which may spread per year per surface unit. For example, in Europe a spreading limitation has recently been introduced based on the nitrogen contents of wastes, virtually limiting the size of pig farms.

Traditionally, organic matter containing excessive biological oxygen demand (BOD) has been treated using microbial action. The process begins with the separation of the organic matter from the remainder or liquid fraction, forming a mass of solids in the form of an activated sludge. Treatment typically involves digestion of the organic material through fermentation of the sludge involving aerobic or anaerobic bacterial action or some combination thereof. These processes are used to reduce the chemical oxygen demand (COD) and biological oxygen demand (BOD) of the material to an environmentally safe level. It is also necessary to remove undesirable inorganic materials from the water fraction, which typically contains undesirable quantities of phosphorus and nitrogen compounds including phosphates and nitrates.

Conventional wastewater treatment systems may include pretreatment, primary treatment, secondary treatment, and advanced treatment. Pretreatment includes screening, comminuting (mechanical cleaning of screens by shredding solids to a size which can pass through screen openings), degritting, and grease and scum removal. Primary treatment includes removal of suspended solids from wastewater by clarification and skimming. This typically involves a tank or channel and the steps of reducing flow velocity, settling heavier solids, and skimming relatively light solids. Primary treatment may include anaerobic digestion processes, aerobic digestion processes, or a combination thereof. Primary treatment systems typically include sludge collection mechanisms, sludge suction devices, grit removal devices, and sludge dewatering devices to reduce the volume of sludge to be disposed. Secondary treatment systems are typically aerobic systems including an aeration phase and a clarification phase. Such systems typically include an aeration tank, an air distribution system, a clarifier, sludge collection mechanisms, and sludge removing devices. Advanced treatment includes further removal of suspended and dissolved organic solids by means including filtration and removal of pathogens by oxidation, chlorination or heating, precipitation of minerals, adsorption, or other methods. In additional steps of the advanced treatment, the purified liquor from the clarifier is typically filtered and refined through chlorination, oxidation, or heating.

In the activated sludge process of primary or secondary treatment, microorganisms are contained in an activated sludge and mixed with incoming wastewater, which provides food for the microorganisms whereby more activated sludge is produced. Such mixing is accomplished in an aeration tank or channel. In the aerobic activated sludge process, oxygen is intrinsically mixed with the activated sludge and the wastewater. The microorganisms use the solids as nutrients for their growth and reproduction, converting the suspended organic solids into biomass, carbon dioxide and water. The aerobic activated sludge process therefore typically includes mixing wastewater, activated sludge, and oxygen in an aeration tank; consuming suspended organic solids by bacteria; settling activated sludge in a clarifier; returning the activated sludge to the aeration tank for further treatment; removing purified liquor from the clarifier; and removing and disposing of the final, inert sludge.

Existing processes and installations for the treatment of such livestock wastes, especially for large farms, have generally been large scale operations having high installation costs. There exists a need to provide a compact, low-cost system and method for treating wastewater.

SUMMARY OF THE INVENTION

The invention provides a facility for treating a daily volume of livestock waste water, comprising a) a collecting basin for continually collecting and stirring raw livestock liquid wastes; b) a pretreatment channel having an inlet end and an outlet end, capable to contain at least said daily volume of waste water, connected at said inlet end with said collecting basin and accepting said raw wastes, which flow through the channel and form a pretreated waste water while allowing for partial settling of dispersed solids and enriching the lower part of the channel with said solids relatively to the upper part; c) an anaerobic reactor connected with said channel at said outlet end and accepting said pretreated waste water from the middle or upper part of said channel in separate batches, each batch allowed to react in the tank and partially settle, forming anaerobically treated waste water being enriched with solids in the lower part of the reactor relatively to the upper part, wherein a portion of said anaerobically treated waste water from said lower part is fed to said channel at said inlet end where it combines with said raw wastes; d) an aerobic stirred reactor connected with said channel at said outlet end and accepting said pretreated waste water from the middle or upper part of said channel in separate batches, and further connected with said anaerobic reactor and accepting said anaerobically treated water from the upper part of said anaerobic reactor in separate batches, each batch allowed to react in the tank and partially settle, forming aerobically treated waste water being enriched with solids in the lower part of the reactor relatively to the upper part, wherein a portion of said aerobically treated waste water from said lower part is fed back to said anaerobic reactor, and said aerobically treated water from the upper part being removed as a safe water product; and e) a compost basin to which cellulose based solid waste is fed, connected with said pretreatment channel at said outlet end and accepting said pretreated waste water from the lower part of said channel, the basin provided with mixing means, whereby providing a quality compost; wherein said daily volume of livestock waste water is converted to a quality compost and safe water for release into municipal system or for use in agriculture. In one embodiment of the invention, the facility comprises a) said basin which has a volume to contain at least two of said daily volumes of waste water; b) said pretreatment channel which has a length of at least 10 times greater than its width, and a volume to contain at least two of said daily volumes of waste water; c) said anaerobic reactor which has a volume to contain at least one said daily volume of waste water, preferably at least two said daily volumes, and is provided with collecting means to collect and process biogas to provide energy for running the facility; d) said aerobic reactor which has a volume to contain at least one said daily volume of waste water, preferably at least two said daily volumes, and is provided with air dispersing means; and e) said compost basin which has a volume to contain at least two, preferably at least five, of said daily volumes, and is provided with mixing means which regularly mix said cellulose waste and said waste water, and transport means which transport the cellulose waste into the basin and the ready compost out; wherein said daily volume of livestock waste water is converted to a quality compost and safe water for use in agriculture or for disposal. The system of the invention is very efficient but also economically less demanding; among others, the sediment channel, possibly a simple long rectangular parallelepiped dug in the ground and made water-proof, even though it is technically a simplest possible element, without any expensive technical means of usual reactors, substantially contributes to the efficiency of the process.

The facility according to the invention may be adjusted to any need in a flexible way, typically being configured to treat from 50 to 400 m$^3$ per day, but possibly up to 2000 m$^3$ per day or more. Said anaerobic reactor is advantageously anaerobic sequencing batch reactor (ASBR) and said aerobic reactor is advantageously sequencing batch reactor (SBR). The facility according to the invention further comprises transfer means for transferring the treated liquid from said collector, via said channel and said anaerobic reactor, into said aerobic reactor and to said compost basin, the means comprising pumps, and possibly gravity driven means. In a preferred embodiment, the facility of the invention comprises automation means, comprising at least one microprocessor, and analytical measuring means, liquid level sensors, analytical means for automatic sampling and measuring the concentration of components, including the amount of solids, in the treated water, and the means to analyze the liquid parameters, including the concentration of solids, along the height of said anaerobic and aerobic reactors. Said microprocessor(s) advantageously manage transferring the materials in the system, and manage the steps of the process. The processed waste may originate in any animal farming. Advantageously, the system of the invention is employed in cattle farming or piggeries. In a preferred embodiment, the facility and the method of the invention are employed in pig farming.

The invention provides a process of treating a livestock waste water, comprising i) collecting raw liquid waste in a stirred collecting tank; ii) transferring said raw liquid waste from said collecting tank to a non-stirred, flow-through channel reactor, said raw liquid waste providing a pretreated liquid waste in said channel; iii) transferring said pretreated liquid waste from said channel via a first outlet to an ASBR and to a SBR at a transfer rate of v3, and via a second outlet to a compost basin at a transfer rate of v4, where said pretreated liquid waste is mixed in said basin with a cellulose waste regularly added to said basin, wherein said v4 is at most 20% of v3, for example about 10% of said v3, and wherein said second outlet is closer to the bottom of said basin than said first outlet, thereby obtaining compost; iv) transferring a part of said pretreated water from said first outlet to said SBR at a transfer rate of v11 and a part to said ASBR at a transfer rate of (v3−v11) wherein said v11 is either zero or up to v3/3, usually zero or up to v3/5, and reacting said pretreated waste water in said ASBR, allowing said waste water to settle, thereby obtaining an anaerobically treated waste water, the solids being more concentrated in the lower part of ASBR (sludge) than in the upper part of ASBR; v) optionally collecting biogas via a gas collector; vi) transferring said anaerobically treated waste water from said upper part of ASBR via a third outlet to said SBR at a transfer rate of v5, and transferring said anaerobically treated waste water from said lower part of ASBR via a fourth outlet to said channel at a transfer rate of v6, wherein said v6 is at most 15% of said v5, and wherein said fourth outlet is closer to the bottom of said ASBR than said third outlet, thereby supplying to said channel an activated sludge; and vii) reacting said anaerobically treated waste water in said SBR, allowing said waste water to settle, thereby obtaining an aerobically treated waste water, the solids being more concentrated in the lower part of SBR (sludge) than in the upper part of SBR, and transferring said aerobically treated waste water from said upper part of SBR via a fifth outlet at a transfer rate of v7 to obtain safe treated water, and transferring said aerobically treated waste water from said lower part of SBR via a sixth outlet back to said ASBR at a transfer rate of v8, wherein v8 is at most 5% of said v7, and wherein said sixth outlet is closer to the bottom of said SBR than said fifth outlet; thereby obtaining safe water for release into municipal system or for use in agriculture, and further a quality compost, and optionally biogas. Said steps of transferring materials in the process of the invention usually comprise portions, which are processed sequentially, usually in 2 to 6 batches a day. Said step iv) comprises homogenization of the reactor content which is attained by inflow and outflow of the liquids. Said transferring the pretreated liquid waste from said first outlet to the ASBR and SBR in steps iii) and iv) comprises branching the stream of said water, preferably via a regulated valve, so that only up to ⅓ of the stream is transferred to the SBR and only at certain periods; usually, the water is allowed to flow into the SBR when the pH in SBR has decreased under the value of 6.5, and the flow is stopped when the pH reaches a predetermined value, for example at least 6.9, such as at least 7.4, so that said v11 is usually either zero or up to v3/3, such as up to v3/5. Said step vii) comprises homogenization of the reactor content which is attained by an intensive air influx and dispersion, and by an intensive mechanical stirring. The mixtures in said steps iv) and vii) are usually allowed to settle for a period of time between about 1 to about 12 hours. The process of the invention is preferably employed for livestock waste water comprising pigs or cattle.

In a preferred embodiment of the invention, provided is a process for treating a piggery waste water, comprising passing said water through a system comprising a pretreatment, flow-through, non-stirred, settling channel at least 10 times longer than wide, an ASBR, and a SBR, wherein a portion of sludge from said SBR is returned to said ASBR, a portion of sludge from said ASBR is returned to said channel, and a portion of sludge from said channel is mixed with a cellulose based waste to form compost; thereby providing a safe water and a high-quality compost.

BRIEF DESCRIPTION OF THE DRAWINGS

The above and other characteristics and advantages of the invention will be more readily apparent through the following examples, and with reference to the appended drawings, wherein.

DETAILED DESCRIPTION

It has now been found that piggery liquid waste can be cost-effectively and efficiently treated in two sequencing batch reactors connected in series, of which the first one is anaerobic sequencing batch reactor (ASBR) and the second one is aerobic sequencing batch reactor (SBR), wherein a) collected raw liquid waste is first pretreated in a non-stirred channel reactor, providing a pretreated liquid waste to be fed to said ASBR, b) a small part of sludge from said ASBR is dosed to said channel, where it combines with said raw liquid waste; c) a small part of sludge from said SBR is dosed to said ASBR, and d) a small part of said pretreated liquid waste is fed to a compost basin where it is mixed with a cellulose waste; thereby producing purified water from said SBR and compost from said basin. The term sludge in this context means that the liquid comprises more suspended materials that the average content in the reactor from which it flows, as a result of sedimentation.

Figure 1:
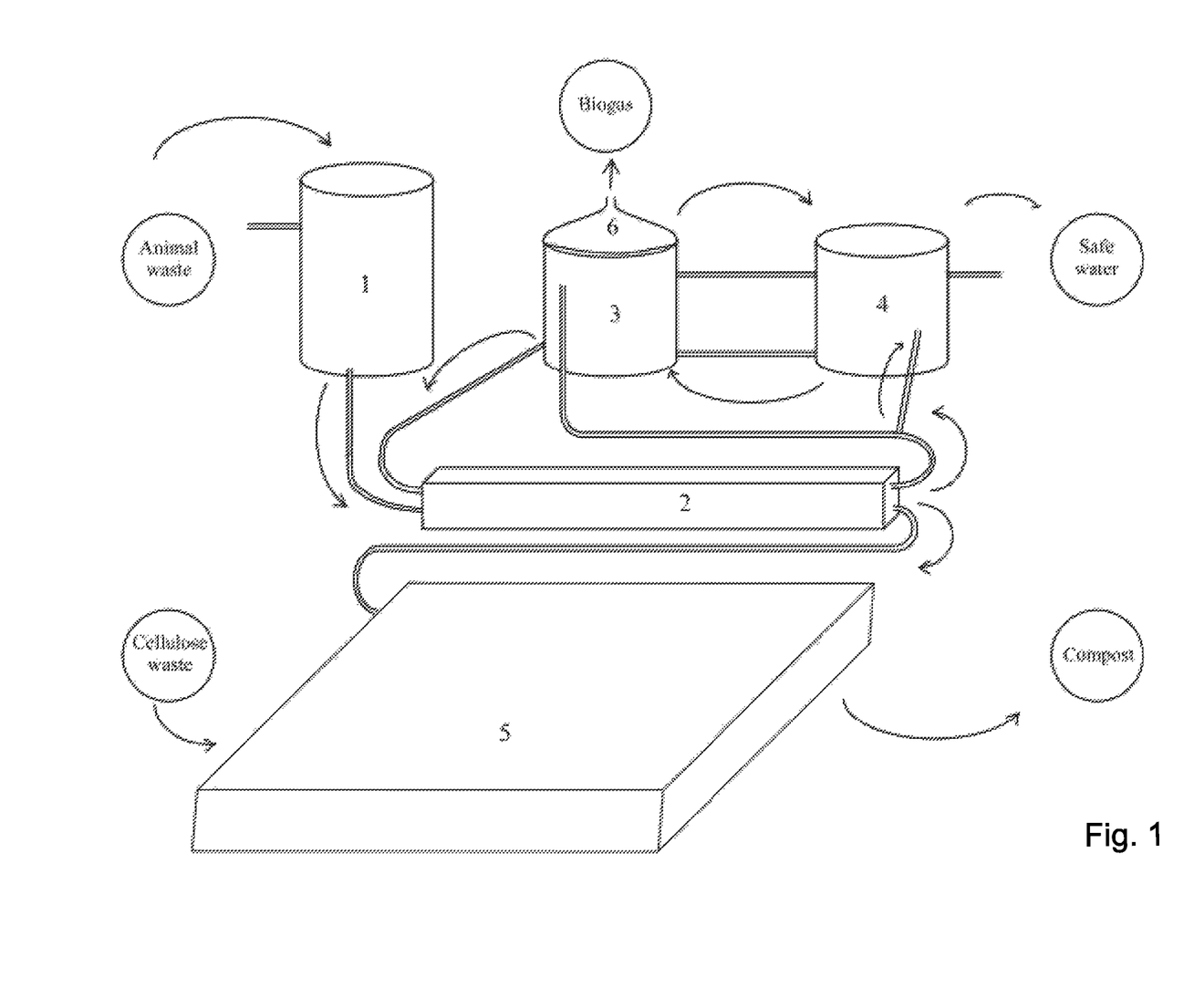
FIG. 1 is a schematic representation of one embodiment of the system according to the invention, which converts animal water waste and cellulose-based waste to safely treated water, high-quality compost, and biogas.

The facility according to the invention comprises at least elements as schematically depicted in FIG. 1. Livestock waste water flows through collecting basin (1) and through settling flow-through channel reactor (2), and further in parallel to ASBR (3) and SBR (4) to produce treated water, and to compost basin (5) to be mixed with cellulose-comprising waste and produce compost; in parallel, a relatively small amount of sludge flows from SBR to ASBR and from ASBR to the channel. Said channel enables preliminary anaerobic hydrolytic decomposition of waste. Said ASBR reactor is advantageously provided with a gas collector (6) to produce biogas. Thus, in the facility according to the invention, and according to the method of the invention, livestock waste and cellulose waste are processed to produce treated water, compost, and biogas.

Figure 2:
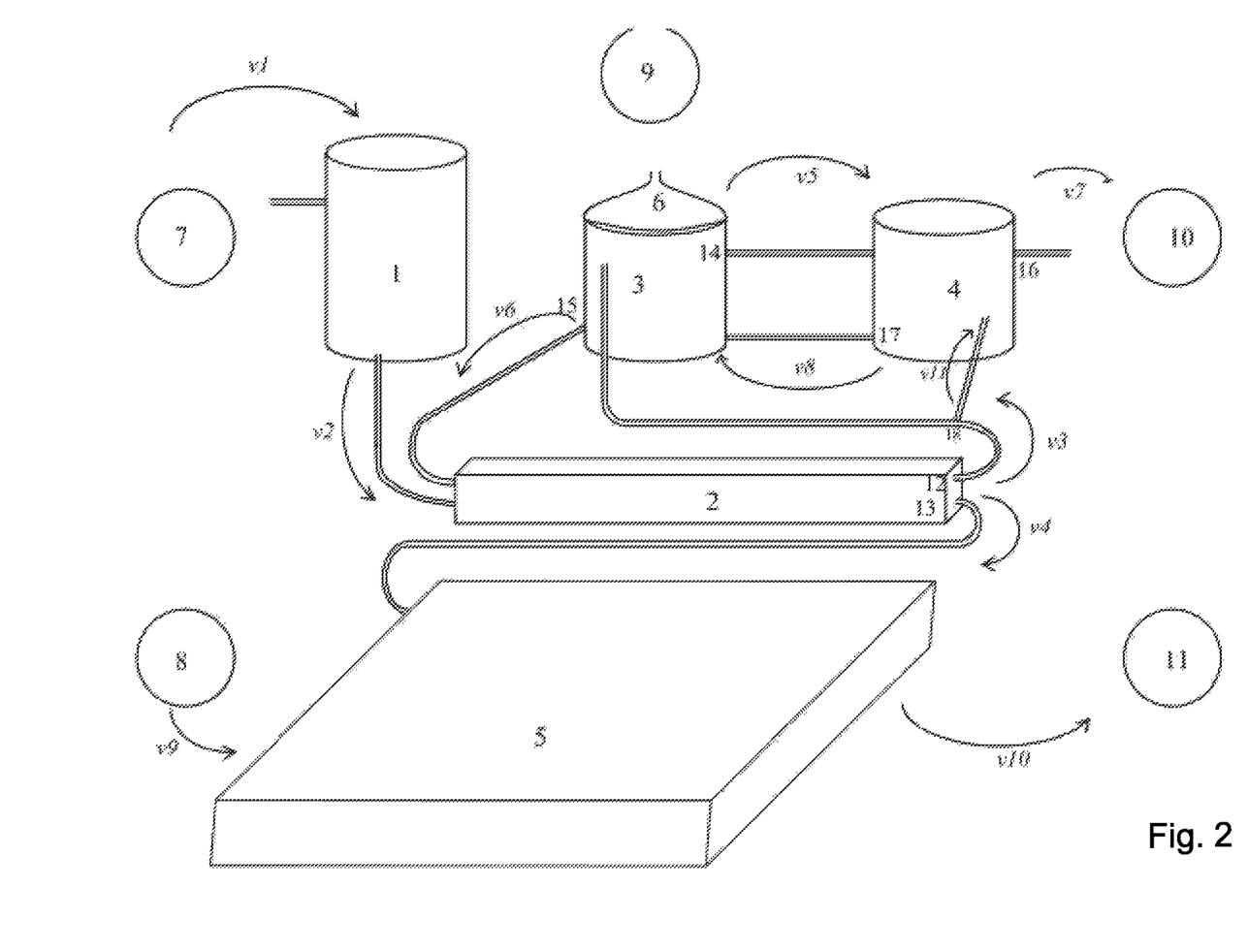
FIG. 2 is a schematic representation of one embodiment of the system according to the invention; equipment elements 1 to 6 and outlets 12 to 18 constitute the base of a facility according to the invention, materials 7 and 8 enter the process of the invention, and materials 9 to 11 are produced in the process, and transfer rates v1 to v11 characterize the movement of the materials in the process of the invention.

In a preferred embodiment, the facility and the process according to the invention comprise elements as the system schematically depicted in FIGS. 1 and 2 to which the following description relates. A preferred process of treating liquid piggery waste (7) comprises i) collecting raw liquid waste in a stirred collecting tank (1) at a rate v1 (all rates are in m3 per day), wherein v1 is usually between 20 and 200 m3/d; ii) transferring said raw liquid waste from said collecting tank to a non-stirred, flow-through channel reactor (2) at a second transfer rate v2, said raw liquid waste providing a pretreated liquid waste in said channel; iii) transferring said pretreated liquid waste from said channel via a first outlet (12) to an ASBR (3) at a third transfer rate v3, and via a second outlet (13) to a compost basin at a fourth transfer rate v4, where said pretreated liquid waste is mixed in said basin with a cellulose waste (8) added at a ninth transfer rate v9, wherein said fourth transfer rate is at most 20% of said third transfer rate, and preferably at most 15% of said third transfer rate, for example about 10% of said third rate, and wherein said second outlet is closer to the bottom of said basin than said first outlet, thereby obtaining compost (11) at a tenth rate v10; iv) reacting said pretreated waste water in said ASBR, allowing said waste water to settle, thereby obtaining an anaerobically treated waste water, the solids being more concentrated in the lower part of ASBR (sludge) than in the upper part of ASBR; v) optionally collecting biogas (9) via a gas collector (6); vi) transferring said anaerobically treated waste water from said upper part of ASBR via a third outlet (14) to said SBR at a fifth transfer rate v5, and transferring said anaerobically treated waste water from said lower part of ASBR via a fourth outlet (15) to said channel at a sixth transfer rate v6, wherein said sixth transfer rate is at most 15% of said fifth transfer rate, for example about 10% of said fifth rate, and wherein said fourth outlet is closer to the bottom of said ASBR than said third outlet, thereby supplying to said channel an activated sludge; vii) reacting said anaerobically treated waste water in said SBR, allowing said waste water to settle, thereby obtaining an aerobically treated waste water, the solids being more concentrated in the lower part of SBR (sludge) than in the upper part of SBR, and transferring said aerobically treated waste water from said upper part of SBR via a fifth outlet (16) at a seventh transfer rate (v7) to obtain treated water (10), and transferring said aerobically treated waste water from said lower part of SBR via a sixth outlet (17) back to said ASBR at an eighth transfer rate v8, wherein said eighth transfer rate is at most 5% of said seventh transfer rate, for example about 2% of said seventh rate, and wherein said sixth outlet is closer to the bottom of said SBR than said fifth outlet. Said transfer rates usually comprise portions (batches) in which the liquid is transferred from one part of the system to the other. Particularly, said steps iv) to vi) usually comprise from 2 to 6 batches a day. As is usual in sequencing batch reactors, a part of the maximal volume of said ASBR and SBR, such as from 1/10 to 1/2 is added in one batch, the content of the reactor is homogenized, the reaction is allowed to run. The homogenization in said ASBR is achieved at least by inflow and outflow of the liquid, optionally by a stirrer. The homogenization said SBR is achieved by an intensive air influx and dispersion, and by an intensive mechanical stirring. In each batch, the mixture is allowed to settle for a period of between 3 and 12 hours in said ASBR, such as between 4 and 6 hours; each cycle usually takes between about a quarter to a half a of the day. In said SBR, the mixture is allowed to settle usually between 0.5 and 3 hours, such as 1-2 hours. Since the second, the fourth, and the sixth outlets are closer to the bottom than the average liquid part in the system, fractionations occur in the involved stages. The raw liquid waste usually comprises 1-3 solids; the waste usually contains between 1.2% and 1.8% non-aqueous materials, such as 1.5%, usually comprising from about 0.6 to 0.9% suspended particles. The liquid in said second, fourth, and sixth outlets may contain up to 10% non-aqueous materials, typically between 4% and 8%, for example 6%. The first, the third, and the fifth outlets drain away decanted liquids, and their contents of non-aqueous materials may be, in some embodiments of the invention, for example less than about 0.8%, less than about 0.2%, and less than about 0.08% respectively.

In one aspect, the invention provides a semicontinual effective process for cleaning livestock waste water, at any scale, during which sewage is continually collected, and processed in repeated batches to purified water, compost, and biogas. When relating to FIG. 2, waste materials (7) and (8) provide products (9), (10), and (11). Regarding material flows and transfer rates, v1 to v8 comprise aqueous liquids, usually aqueous suspensions, whereas v9 and v10 comprise wet solids; practically, also v9 and v10 may be conveniently expressed in m$^3$/d. Practically, in the semicontinual process of the invention, v1+v9=v7+v10, since the weight of biogas is relatively small, and the densities of the cellulose based waste and the compost are not too far from 1. In one embodiment of the invention, v9 is from about v4/2 to about 2*v4, such as about v4. The pretreated water from the channel may be distributed to ASBR and the compost basin at transfer rates v3 and v4 in a ratio of about 10:1; the activated sludge from ASBR may be distributed to SBR and the channel at transfer rates v5 and v6 in a ratio of about 10:1; the activated sludge from SBR may be transferred to ASBR at transfer rate v8 of about 0.02*v7. In any case, the following relations will approximately hold: v2+v6=v3+v4 for the channel; v4+v9=v10 for the compost basin; v3+v8−v11=v5+v6 for the ASBR; and v5+v11=v7+v8 for the SBR.

Figure 3:
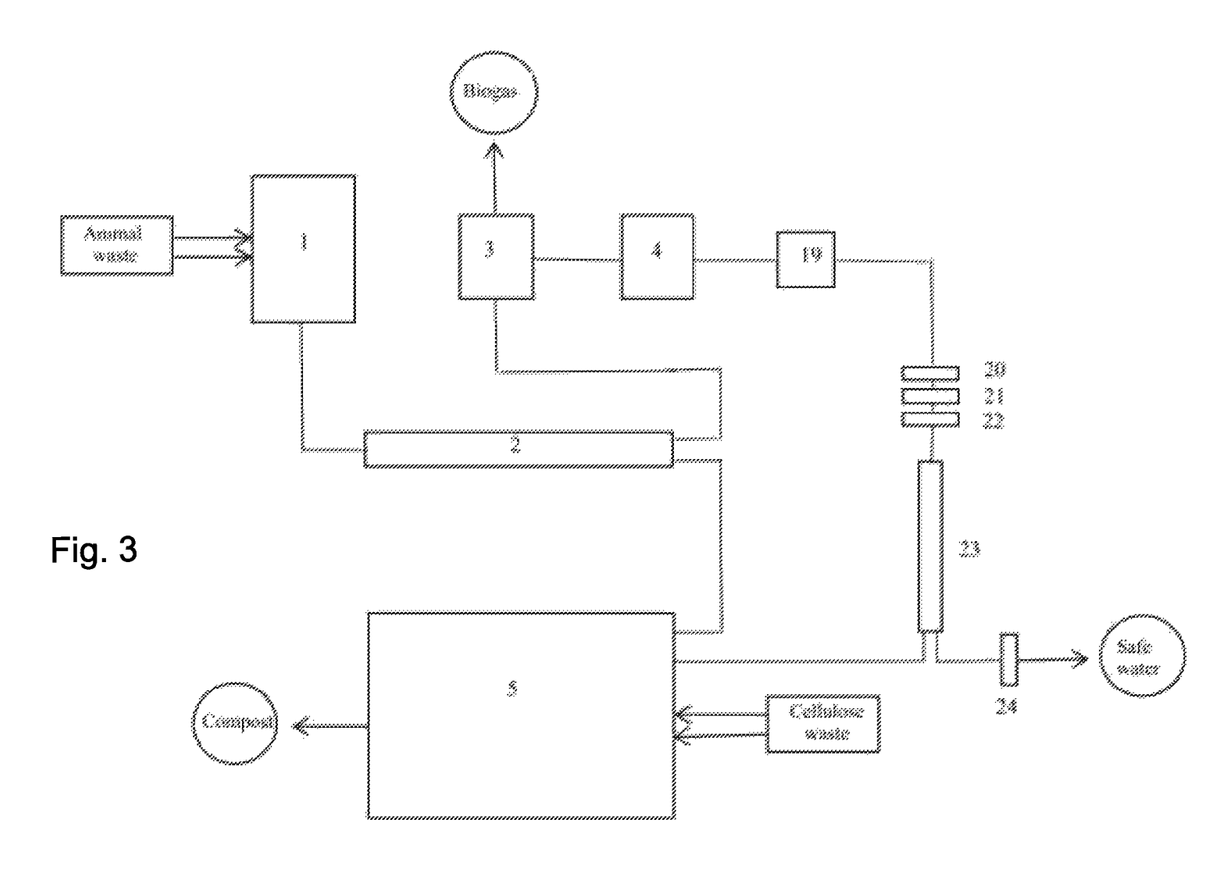
FIG. 3 is a schematic representation of one embodiment of the system according to the invention, which provides clean water from animal liquid waste, and which further provides compost and biogas as side products while utilizing cellulose waste; the system comprises collecting basin 1 and compost basin 5, primary treatment elements 2 and 3 (channel reactor and ASBR), secondary treatment element 4 (SBR), tertiary treatment element 19 (sand filter), and quaternary treatment elements 20-24 (microfilter, carbon filter 1, carbon filter 2, RO device, carbon filter 3).

In an important aspect of the invention, animal liquid waste flows through the purification system of the invention and provides safe water, for example as seen in FIG. 3, or in FIG. 1 in which waste liquid 7 provides safe water 10. Superb results of the system according to the invention are attained through a plurality of tuned fractionating steps and a plurality of tuned backflows, as seen in FIG. 2: such a partition occurs in the channel reactor at the outlet of which a smaller part of the stream is removed (v4<v3), and the tuned backflows occur in ASBR from which a smaller part returns to the channel reactor (v6<v5), and in SBR from which a smaller part returns to the ASBR (v8<v7); the ratios of v4/v3, v6/v5, and v8/v7 being important regulation parameters.

In one preferred embodiment of the invention, the system for treating livestock waste waters, including the facility and the process according to the invention, comprises additional stages of water purification according to the external requirements and according to the desired use of the final water product; said additional stages preferably follow the aerobic treatment, for example the treatment in a SBR. Said additional stages preferably comprise filtration steps, such as sand filtration and reverse osmosis filtration (RO). In a preferred embodiment, water treated in a SBR flows to a sand filter and then to an RO system. The whole process, comprising a primary, anaerobic stage (preferably employing a pretreatment channel and an ASBR) and a secondary, aerobic stage (preferably employing a SBR), thus comprises in one embodiment a tertiary stage (sand filter) and a quaternary stage (RO). Said quaternary stage usually employs microfilter (μF) followed by two carbon filters (CF1, CF2) before employing reverse osmosis process, and is usually finalized with another carbon filter (CF3). The sand filtration usually removes most of particles greater than 50 μm, said microfilter most of particles greater than 5 μm. The RO step advantageously lowers salinity of the waste water, for example water from piggery farms, after aerobic treatment; the RO treatment may be repeated according to the need, and after the third RO cycle, up to 90% final treated water relatively to the volume of the aerobically treated water may be obtained. In case of RO recycling, one or two holding tanks are included in the system for storing the concentrate before reprocessing.

FIG. 3 schematically shows a system according to one embodiment of the invention, in which animal liquid waste is converted to a high-quality safe water, further providing compost and biogas as side products while utilizing cellulose waste; the system comprises collecting basin 1 and compost basin 5, primary treatment elements 2 (channel reactor) and 3 (ASBR), secondary treatment element 4 (SBR), tertiary treatment element 19 (sand filter), and quaternary treatment elements including microfilter 20, $1^{st}$ carbon filter 21, $2^{nd}$ carbon filter 22, RO unit 23, and $3^{rd}$ carbon filter 24. The anaerobic reactor 3 produces biogas, and the sediment fraction from the pretreatment channel, together with cellulose waste, and with the saline discharge from the RO unit form compost.

In another aspect, the present invention relates to a facility and a method for treating livestock wastes. The system of the invention, constituting the base of said facility and method, comprises:

A collecting basin, to where all the waste from the animal's house (secretions, washing liquids) is collected. The collected sewage is stirred while some preliminary oxidation occurs. For example, in case of a piggery, the collected sewage may contain about 1.5% solids.

A compost basin, and at least one sedimentation channel through which sewage is transferred to said compost basin, to an anaerobic tank, and intermittently to an aerobic tank; as said sewage flows through the channel, the solids sediment, and the slurry closer to the bottom with relatively more settled material arrives to the compost basin, and is stirred with wood splinters and allowed to form a high-quality compost. As a small part of said ASBR content, close to the bottom of the ASBR, is brought to the channel together with the raw sewage, the channel contains an activated sludge, containing the microorganisms from said anaerobic reactor, supporting desired biological processes in the channel, and starting the anaerobic decomposition process already in the channel. The hydraulic retention time in the channel is typically 2-4 days. The retention time in the compost basin is usually between 10 and 30 days.

At least one anaerobic tank, and one aerobic tank, preferably an anaerobic sequential batch reactor (ASBR) and aerobic batch reactor (SBR), wherein in the former tank, phosphates are removed and nitrogen and COD reduced, and in the latter, remaining nitrogen is removed. The anaerobic reactor receives small amounts of the sludge from said aerobic reactor; the term sludge in this content means that the liquid comprises more suspended materials that the average content in the reactor from which it flows, as a result of sedimentation. The partially decanted slurry from said channel flows to the ASBR and to the SBR, wherein the flow is branched, so that only up to ⅓ of the stream is transferred to the SBR and only at certain periods; usually, the water is allowed to flow into the SBR when the pH in SBR has decreased under the value of 6.5, and the flow is stopped when the pH reaches a predetermined value, for example at least 6.9, such as at least 7.4, for example 7.5, so that said flow to the SBR is zero or up to ⅓ of the flow to the ASBR, such as ⅕ or less of the flow to the ASBR; the period of the zero flow may be, for example, about 20 days, followed by a period of about ten days of non-zero flow. The sludge retention time in the reactors is typically 12-24 hours, while the solids retention time in the ASBR may be 20-35 days and in the SBR 10-20 days.

Optionally a collecting dome on the ASBR to collect the released biogas. The biogas, mainly methane, may be used for heating the reactor, heating the animal's houses, and producing the electricity needed for running the farm.

In one embodiment of the invention, the facility has a capacity of 25-400 $m^3$ of raw waste water per day, for example between 50 and 200 $m^3$ of piggery waste liquid per day.

The term "livestock" refers herein to domesticated animals raised in an agricultural setting to produce commodities such as food, fiber and labor. Examples of such domesticated animals includes alpaca, banteng, bison, camel, cattle, deer, donkey, gayal, goat, horse, lama, pig, reindeer, sheep, water buffalo, and yak. More particularly, the term relates to pigs and cattle.

The term "retention time" (RT), also known as residence time or $\tau$ (tau), refers herein to the average length of time that material (for example water suspension) remains in a containing unit (for example, reactor). RT is the volume of the containing unit divided by the influent flow rate (transfer rate). The flow rates or transfer rates are here expressed in $m^3$ per day, $m^3/d$, the RT is in days. The term "sludge retention time", or "solids retention time (SRT)" relates to the average time the microorganisms are retained in the containing unit (for example, reactor). Sludge retention time is the biosolids amount in the system divided by the rate of biosolids loss from the system.

The invention provides a technically non-complex system, without expensive equipment, flexible and scalable, particularly for neutralizing water from piggeries and cattle farming, comprising preliminary sedimentation, anaerobic treatment, aerobic treatment, and treatment of the sludge by composting. In one embodiment, a facility according to the invention may comprises:
- a blending basin;
- a compost basin, comprising at least one pretreatment channel and a compost tank;
- at least one anaerobic reactor; and
- at least one aerobic reactor.

In another embodiment, a process according to the invention comprises:
- collecting the waste into the blending basin;
- transferring the waste to the channel, wherein the hydraulic retention time is 2-4 days;
- transferring the liquids from the compost basin to the anaerobic reactor, in which the hydraulic retention time is 12-24 hours, and the sludge retention time is 35-37 days; and
- transferring the liquids from the anaerobic reactor to the aerobic reactor;

wherein a part of the sludge of the aerobic reactor is transferred to the anaerobic reactor and a part of the sludge of the anaerobic reactor transferred to the end of the channel, and wherein a part of the stream form the channel to the anaerobic reactor is occasionally branched off to the aerobic reactor to increase the pH.

The system of the invention is particularly advantageous for piggery farming, and the system can be scaled according to the need. The essence of the invention lies in A) converting the livestock waste water to a slurry enriched with an activated sludge, and B) fractionating the slurry in at least two sedimentation stages during which a more concentrated fraction is transferred to a compost basin to react with a cellulose based waste and a less concentrated fraction is transferred to further water processing. Said step A) is attained by transferring a part of settled sludge from an ASBR reactor to a flow-through channel reactor, said step B) is attained by settling the slurry in the flow-through channel and in said ASBR reactor and by taking the liquid for further processing form the upper part of the settled mixture. Without committing themselves to any particular theory, based on their experimental findings, the inventors believe that the excellent results are obtained due to a special combination of the physical and biological effects occurring in the system according to the invention, enabling efficiently processing large volumes of animal waste, while providing water of desired purity and good compost.

The system can be adjusted according to the quality of the raw animal waste and also according to the required quality of final water. For example, in one embodiment, final water may be released to the municipal waste system; in other embodiment, final water may be employed in agriculture. The quality of the final water may be regulated, for example, by adjusting the retention times in the reactors; however, additional purification steps may be added to modify the quality of the final safe water according to the relevant requirements and regulations. The quality of the obtained compost may be regulated according to the needs, for example by modifying the sludge/cellulose waste ratio, or by employing various types of cellulose waste.

In a first aspect, the invention is directed to a system, including a facility and a method, for treating animal liquid waste and providing safe water and compost, wherein said treating comprises at least a primary treatment stage and a secondary treatment stage employing an anaerobic reactor and an aerobic reactor, in which system said animal liquid waste and a cellulose based waste are converted to said safe water and compost, and optionally biogas. Such system is particularly useful in pig farming. In a second aspect, the invention is directed to a system, including a facility and a method, for treating animal waste comprising a liquid component and a solid component, wherein said liquid component is treated at least by a primary treatment stage and a secondary treatment stage employing an anaerobic reactor and an aerobic reactor, in which system said animal liquid waste and a cellulose based waste are converted to safe water and compost, and optionally biogas, wherein said solid component is added to said cellulose based waste or essentially forms said cellulose based waste. Such system is particularly useful in dairy farming.

The invention will be further described and illustrated in the following example.

EXAMPLES

The following acronyms are used herein:
ASBR Anaerobic Sequencing Batch Reactor
SBR Sequencing Batch Reactor
COD Chemical Oxygen Demand
BOD Biochemical Oxygen Demand
TSS Total Suspended Solids
TKN Total Kjehldahl Nitrogen
N—NH4 Ammonia-Nitrogen FOG Fats, Oils and Greases
TP Total Phosphorous
μF Microfilter
CF Carbon Filter
RO Reverse Osmosis Example 1

A prototype facility was built in a North Israel piggery, in order to process waste collected from ~4,000 pigs. The facility is a sequential, biological treatment facility for the treatment of daily throughput of 50 cubic meters of liquid waste. The treated waste contained pig urine, excrements, and washing water from a piggery. The medium-sized facility comprised a 200 m$^3$ pretreatment channel and two reactors of 100 m$^3$ each, serving as the anaerobic and aerobic reactors. About 50 m$^3$ of the collected raw waste water from the collecting basin was pumped to the pretreatment channel every day. The channel was further fed with an activated sludge from the anaerobic reactor, from the lower part after settling. The lower part of the liquid in the channel, with precipitated solids, was led to the compost basin, wherein it was mixed with wood splinters, 5 m$^3$ slurry a day and about 5 tons splinters. Two batches of 25 m$^3$ each were daily collected from the end of the channel to the anaerobic reactor. The liquid was fed from the bottom of the container, generating a stir. During the anaerobic reaction, the COD, BOD, TSS and PT were reduced. It was estimated that burning the biogas released in the anaerobic reaction could provide at least 100 KW throughout the day. The decanted waste from the anaerobic reactor is then fed to the aerobic reactor twice a day, for final step of de-nitrification. Sludge from the aerobic reactor, after settling, was returned in an amount of 2 m$^3$ to the anaerobic reactor. The sludge retention time was estimated at 37 days, while the hydraulic retention was about 12-24 hours.

The following values were obtained for the treated water (average values from several experimental treatment cycles are followed by target values for the disposed water):

|  | pH | BOD (mg/l) | COD (mg/l) | TSS (mg/l) | TKN (mg/l) | N—NH4 (mg/l) | FOG (mg/l) | TP (mg/l) |
| --- | --- | --- | --- | --- | --- | --- | --- | --- |
| Inlet to channel | 7.5 | 6,500 | 15,000 | 9,200 | 1,800 | 800 | 400 | 320 |
| Outlet from channel to ASBR |  | 6,000 | 12,000 | 6,000 | 1,600 |  |  | 280 |
| Outlet from ASBR to SBR |  | 1,150 | 2,300 | 900 | 1,100 |  |  | 50 |
| Outlet from SBR to dispose |  | 900 | 1,900 | 800 | 450 |  |  | 19 |
| Outlet from channel to compost |  | 50,000 | 90,000 | 80,000 | 5,500 |  |  | 2,000 |
| Target dispose value | 6-10 | <500 | <2,000 | <1,000 | <100 |  | <100 | <30 |

At the end of the process, the waste was within the permitted parameter for discarding to the municipal sewage treatment system.

Example 2

A small pilot system was built in a Central Israel cow shed with 300 milking cows, processing waste collected from 20 cows. Liquid waste was processed similarly as in Example 1, but about 20 times lower volumes of the pretreatment channel and two reactors were employed (about 6 m$^3$ channel reactor and about 5 m$^3$ each), serving as the anaerobic and aerobic reactors. About 3 m$^3$ a day of the collected raw waste water from the collecting basin was pumped to the pretreatment channel, and the water from aerobic reactor was filtered on a sand filter, and further in a sequence of μF/CF1/CF2 followed by RO device and the final CF3.

|  | COD (mg/l) | N—NH4 (mg/l) | Chlorides (mg/ml) | Polyphenols (mg/ml) | Na (mg/ml) |
| --- | --- | --- | --- | --- | --- |
| Outlet from SBR | 1190 | 89 | 334 | 59 | 253 |
| Saline discharge | 1350 | 101 | 366 | 57 | 256 |
| Final pure water | 129 | 37 | 157 | <20 | 112 |

While this invention has been described in terms of some specific examples, many modifications and variations are possible. It is therefore understood that within the scope of the appended claims, the invention may be realized otherwise than as specifically described.

The invention claimed is:

1. A facility for treating a daily volume of livestock waste water, comprising
    a) a collecting basin for continually collecting and stirring raw livestock liquid wastes;
    b) a pretreatment channel having an inlet end and an outlet end, capable to contain at least said daily volume of waste water, connected at said inlet end with said collecting basin and accepting said raw wastes, which flow through the channel and form a pretreated waste water while allowing for partial settling of dispersed solids and enriching the lower part of the channel with said solids relatively to the upper part;
    c) an anaerobic reactor connected with said channel at said outlet end and accepting said pretreated waste water from the upper part of said channel in separate batches through a connecting pipe, each batch allowed to react in the reactor and partially settle, forming anaerobically treated waste water being enriched with solids in the lower part of the reactor relatively to the upper part, wherein a portion of said anaerobically treated waste water from said lower part is fed to said channel at said inlet end where it combines with said raw wastes, said connecting pipe being branched to enable a part of said pretreated waste water to flow to an aerobic stirred reactor;
    d) the aerobic stirred reactor connected with said anaerobic reactor and accepting said anaerobically treated water from the upper part of said anaerobic reactor in separate batches, each batch allowed to react in the aerobic reactor and partially settle, forming aerobically treated waste water being enriched with solids in the lower part of the aerobic reactor relatively to the upper part, wherein a portion of said aerobically treated waste water from said lower part is fed back to said anaerobic reactor, and said aerobically treated water from the upper part being removed as a safe water product, the aerobic reactor connected to said connecting pipe, which pipe is provided with a valve enabling to divide the flow of said pretreated waste water from the upper part of said channel between said anaerobic reactor and said aerobic reactor; and e) a compost basin to which cellulose based solid waste is fed, connected with said pretreatment channel at said outlet end and accepting said pretreated waste water from the lower part of said channel, the basin provided with mixing means, whereby providing a quality compost;

wherein said daily volume of livestock waste water is converted to a quality compost and safe water for release into municipal system or for use in agriculture.

2. The facility of claim 1, wherein
a) said collecting basin has a volume to contain at least two of said daily volumes of waste water;
b) said pretreatment channel has a length of at least 10 times greater than its width, and a volume to contain at least two of said daily volumes of waste water;
c) said anaerobic reactor has a volume to contain at least one said daily volume of waste water, and is provided with collecting means to collect and process biogas to provide energy for running the facility;
d) said aerobic reactor has a volume to contain at least one said daily volume of waste water, and is provided with air dispersing means; and
e) said compost basin has a volume to contain at least ten of said daily volumes, and is provided with mixing means which regularly mix said cellulose waste and said waste water, and transport means which transport the cellulose waste into the basin and the compost out;

wherein said daily volume of livestock waste water is converted to a quality compost, biogas, and safe water for use in agriculture.

3. The facility according to claim 1, wherein the capacity of the facility is from 50 to 400 m³ per day.

4. The facility according to claim 1, wherein said anaerobic reactor is anaerobic sequencing batch reactor (ASBR) and said aerobic reactor is sequencing batch reactor (SBR).

5. The facility according to claim 1, further comprising transfer means for transferring the treated liquid from said collector, via said channel and said anaerobic reactor, into said aerobic reactor and to said compost basin.

6. The facility of claim 5, wherein said means comprise pumps and gravity driven means.

7. The facility of claim 1, further comprising analytical means for automatic sampling and measuring the concentration of components, including the amount of solids, in the treated water.

8. The facility of claim 7, wherein said means measure the concentration of solids along the height of said anaerobic and aerobic reactors.

9. The facility of claim 7, wherein the results of said measurements are fed to a microprocessor which manages transferring materials in the system facility.

10. The facility of claim 1, for processing waste water from a pig or cattle farm.

11. The facility of claim 1, further comprising a sand filter for processing water provided by said aerobic stirred reactor.

12. The facility of claim 1, further comprising a reverse osmosis system for processing water provided by said aerobic stirred reactor.

13. The facility of claim 1, further comprising a sand filter and a reverse osmosis system for processing water provided by said aerobic stirred reactor.

14. A process of treating a livestock waste water comprising
i) collecting raw liquid waste in a stirred collecting tank;
ii) transferring said raw liquid waste from said collecting tank to a non-stirred, flow-through channel reactor, said raw liquid waste providing a pretreated liquid waste in said channel;
iii) transferring said pretreated liquid waste from said channel via a first outlet to an ASBR and to an SBR at a transfer rate of v3, and via a second outlet to a compost basin at a transfer rate of v4, where said pretreated liquid waste is mixed in said basin with a cellulose waste regularly added to said basin, wherein said v4 is at most 20% of said v3, wherein said second outlet is closer to the bottom of said basin than said first outlet, thereby obtaining a quality compost, and
iv) dividing a part of said transferred pretreated liquid waste from said first outlet, via a regulated valve, so that a part of the stream is transferred to the SBR, at predetermined periods, at a transfer rate of v11 to rectify the pH in said SBR to alkaline values;
v) reacting said pretreated waste water in said ASBR, allowing said waste water to settle, thereby obtaining an anaerobically treated waste water and solids, the solids being more concentrated in the lower part of ASBR (sludge) than in the upper part of ASBR;
vi) optionally collecting biogas via a gas collector;
vii) transferring said anaerobically treated waste water from said upper part of ASBR via a third outlet to said SBR at a transfer rate of v5, and transferring said anaerobically treated waste water from said lower part of ASBR via a fourth outlet to said channel at a transfer rate of v6, wherein said v6 is at most 15% of said v5, and wherein said fourth outlet is closer to the bottom of said ASBR than said third outlet, thereby supplying to said channel an activated sludge; and
viii) reacting said anaerobically treated waste water in said SBR, allowing said waste water to settle, thereby obtaining an aerobically treated waste water, the solids being more concentrated in the lower part of SBR (sludge) than in the upper part of SBR, and transferring said aerobically treated waste water from said upper part of SBR via a fifth outlet at a transfer rate of v7 to obtain safe treated water, and transferring said aerobically treated waste water from said lower part of SBR via a sixth outlet back to said ASBR at a transfer rate of v8, wherein v8 is at most 5% of said v7, and wherein said sixth outlet is closer to the bottom of said SBR than said fifth outlet;

thereby obtaining safe water for release into municipal system or for use in agriculture, and further a quality compost, and optionally biogas.

15. The process of claim 14, wherein said step iv) comprises opening the valve and allowing the flow of said pretreated liquid waste from said first outlet to the SBR when the pH in the SBR decreases to 6.9 or less, and closing the valve and stopping the flow when the pH in the SBR reaches 7.3 or more.

16. The process of claim 14, wherein said step vi) comprises utilizing the biogas to obtain energy for running the process.

17. The process of claim 14, wherein said steps of transferring comprise portions, usually from 2 to 6 batches a day.

18. The process of claim 14, wherein said step v) comprises homogenization of the reactor content which is attained by inflow and outflow of the liquids.

19. The process of claim 14, wherein said step viii) comprises homogenization of the reactor content which is attained by an intensive air influx and dispersion, and by an intensive mechanical stirring.

20. The process of claim 14, wherein the mixtures in steps v) and viii) are allowed to settle for a period of between 2 to 10 hours.

21. The process of claim 14, wherein livestock waste water comprises pigs or cattle.

22. The process of claim 14, for treating a piggery waste water, comprising passing said water through a system comprising
   a pretreatment, flow-through, non-stirred, settling channel at least 10 times longer than wide,
   an ASBR receiving pretreated water from said channel, and
   a SBR receiving water from said ASBR,
wherein a portion of sludge from said SBR is returned to said ASBR, a portion of sludge from said ASBR is returned to said channel, and a portion of sludge from said channel is mixed with a cellulose based waste to form compost; thereby providing a safe water and a high-quality compost.

23. The process of claim 14, comprising filtering said aerobically treated water in a sand filter and in a reverse osmosis system.

* * * * *